United States Patent
Rong et al.

(10) Patent No.: US 10,442,925 B2
(45) Date of Patent: Oct. 15, 2019

(54) CPE/CR BLEND CO-CURED BY A THIADIAZOLE OR TRIAZINE CURE SYSTEM

(71) Applicant: ContiTech USA, Inc., Fairlawn, OH (US)

(72) Inventors: Guangzhuo Rong, Hudson, OH (US); Thomas George Burrowes, North Canton, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 54 days.

(21) Appl. No.: 15/851,749

(22) Filed: Dec. 22, 2017

(65) Prior Publication Data

US 2019/0194440 A1    Jun. 27, 2019

(51) Int. Cl.
| | |
|---|---|
| *C08L 11/00* | (2006.01) |
| *C08L 23/28* | (2006.01) |
| *B32B 1/08* | (2006.01) |
| *B32B 25/04* | (2006.01) |
| *B32B 27/26* | (2006.01) |
| *C08K 3/22* | (2006.01) |
| *C08K 5/17* | (2006.01) |
| *C08K 5/47* | (2006.01) |
| *F16L 11/08* | (2006.01) |
| *F16L 11/12* | (2006.01) |

(52) U.S. Cl.
CPC .............. *C08L 23/286* (2013.01); *B32B 1/08* (2013.01); *B32B 25/04* (2013.01); *B32B 27/26* (2013.01); *C08K 3/2279* (2013.01); *C08K 5/17* (2013.01); *C08K 5/47* (2013.01); *C08L 11/00* (2013.01); *F16L 11/08* (2013.01); *F16L 11/12* (2013.01); *B32B 2255/10* (2013.01); *B32B 2270/00* (2013.01); *B32B 2597/00* (2013.01); *C08K 2003/222* (2013.01)

(58) Field of Classification Search
CPC .......... C08L 23/286; C08L 11/00; B32B 1/08; B32B 25/04; B32B 27/26; B32B 2255/10; B32B 2270/00; B32B 2597/00; C08K 3/2279; C08K 5/17; C08K 5/47; C08K 2003/222; F16F 11/08; F16F 11/12
See application file for complete search history.

(56) References Cited

U.S. PATENT DOCUMENTS

| | | | | |
|---|---|---|---|---|
| 5,237,010 A | * | 8/1993 | Tojo et al. | C08F 8/20 525/192 |
| 5,686,537 A | * | 11/1997 | Class | C08K 5/0025 525/349 |
| 2003/0084949 A1 | | 5/2003 | Hooren | |
| 2005/0059764 A1 | | 3/2005 | Beck | |
| 2006/0270783 A1 | | 11/2006 | Beck | |
| 2008/0072984 A1 | | 3/2008 | Branch et al. | |
| 2009/0000685 A1 | | 1/2009 | Shinoda et al. | |
| 2010/0300571 A1 | | 12/2010 | Miller et al. | |
| 2011/0226375 A1 | | 9/2011 | Harris et al. | |
| 2013/0158170 A1 | * | 6/2013 | Laakso, Jr. et al. | C08K 5/0025 524/89 |

* cited by examiner

*Primary Examiner* — Nathan M Nutter
(74) *Attorney, Agent, or Firm* — David L. Cate

(57) ABSTRACT

Fuel lines including an inner tube, a reinforcement layer disposed outwardly from the inner tube, and a cover layer disposed outwardly from the reinforcement layer. The cover layer and/or inner tube are formed from compositions including a blend of chlorinated polyethylene (CPE) and chloroprene rubber (CR), where the CPE and CR are blended in a CPE:CR weight ratio of from 20:1 to 1:1. The compositions also include a curing system containing tetrabutylammonium bromide (TBAB), magnesium oxide (MgO), and one of a thiadiazole or thiotriazine. In some aspects, the TBAB is incorporated in an amount of from 0.2 phr to 2.5 phr, the MgO incorporated in an amount of from 5 phr to 20 phr, and the one of a thiadiazole or thiotriazine incorporated in an amount of from 0.5 phr to 5 phr.

20 Claims, 2 Drawing Sheets

CPE/CR BLEND CO-CURED BY A THIADIAZOLE OR TRIAZINE CURE SYSTEM

FIELD

The field to which the disclosure generally relates to rubber compositions, and specifically to rubber compositions useful for providing hose or other rubber based articles having excellent high temperature properties and flame resistance, as well as resistance to damage from oil and fuels.

BACKGROUND

This section provides background information to facilitate a better understanding of the various aspects of the disclosure. It should be understood that the statements in this section of this document are to be read in this light, and not as admissions of prior art.

For hoses, and other rubber articles, requiring one or more layers which are required to possess sufficient properties under high temperature conditions, while exposed to flames, and/or while exposed to oil or fuels, certain rubber materials are conventionally used to achieve such properties. Some exemplary rubber products of this type include fuel line (SAE-30R7) used in automotive application, welding hose, cold side return turbo charger hose, fire resistant conveyor belt cover, power transmission belting, air spring for application where high temperatures are encountered, and the like. Conventional rubber materials used in forming these product types typically include chlorosulfonated polyethylene (CSM) synthetic rubber, and/or chloroprene rubber (CR). However, chlorosulfonated polyethylene synthetic rubber and chloroprene rubber have certain drawbacks, such as formulating limitations, complicated processing, as well as relatively high cost.

Alternatively, chlorinated polyethylene (CPE) and CR are known to be blended in different ratios, and co-cured with a blend of metal oxide cure system and a peroxide cure system. There are also many prior arts use CPE as an additive in CR formulation for various purposes. This approach uses a hybrid cure system (metal oxide and peroxide) which is a complex cure system. Also, one other drawback is peroxide cannot be used in rubber product cover compounds subjected to hot air cure or steam cure, since oxygen will react with peroxide and cause elastomer degradation. Furthermore, peroxide generally requires more expensive ingredients in the compound. Additionally, low cost aromatic processing oil may interfere with peroxide cure systems.

Hence, it is desirable to have rubber articles with layer(s) having sufficient properties under high temperature conditions, while exposed to flames, and/or while exposed to oil or fuels, while avoiding use of high cost raw materials and complicated curing systems, such need met, at least in part, with embodiments according to this disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, compositions include a blend of chlorinated polyethylene (CPE) and chloroprene rubber (CR), where the CPE and CR are blended in a CPE:CR weight ratio of from 20:1 to 1:1, as well as a curing system including tetrabutylammonium bromide (TBAB), magnesium oxide (MgO), and one of a thiadiazole or thiotriazine. The compositions may further include antimony trioxide, and the antimony trioxide may be incorporated in an amount of from 0.4 phr to 4 phr. In some aspects, the CPE:CR weight ratio is of from 9:1 to 7:3.

In some cases, the TBAB is incorporated in an amount of from 0.2 phr to 2.5 phr, the MgO incorporated in an amount of from 5 phr to 20 phr, and the one of a thiadiazole or thiotriazine incorporated in an amount of from 0.5 phr to 5 phr. In some aspects, the curing systems are devoid of free sulfur and peroxide. In some cases, the TBAB is incorporated in an amount of from 0.3 phr to 2 phr. Also, in some cases, the one of a thiadiazole or thiotriazine is incorporated in an amount of from 0.8 phr to 3.0 phr.

In another aspect of the disclosure, fuel lines include an inner tube, a reinforcement layer disposed outwardly from the inner tube, and a cover layer disposed outwardly from the reinforcement layer. The cover layer may be formed from compositions including a blend of chlorinated polyethylene (CPE) and chloroprene rubber (CR), where the CPE and CR are blended in a CPE:CR weight ratio of from 20:1 to 1:1. The compositions further include a curing system including tetrabutylammonium bromide (TBAB), magnesium oxide (MgO), and one of a thiadiazole or thiotriazine. The compositions may further include antimony trioxide.

In yet another aspect of the disclosure, hoses include an inner tube, a reinforcement layer disposed outwardly from the inner tube, and a cover layer disposed outwardly from the reinforcement layer, where the inner tube may be formed from compositions including a blend of chlorinated polyethylene (CPE) and chloroprene rubber (CR), where the CPE and CR are blended in a CPE:CR weight ratio of from 20:1 to 1:1. The compositions further include a curing system including tetrabutylammonium bromide (TBAB), magnesium oxide (MgO), and one of a thiadiazole or thiotriazine. The compositions may further include antimony trioxide.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
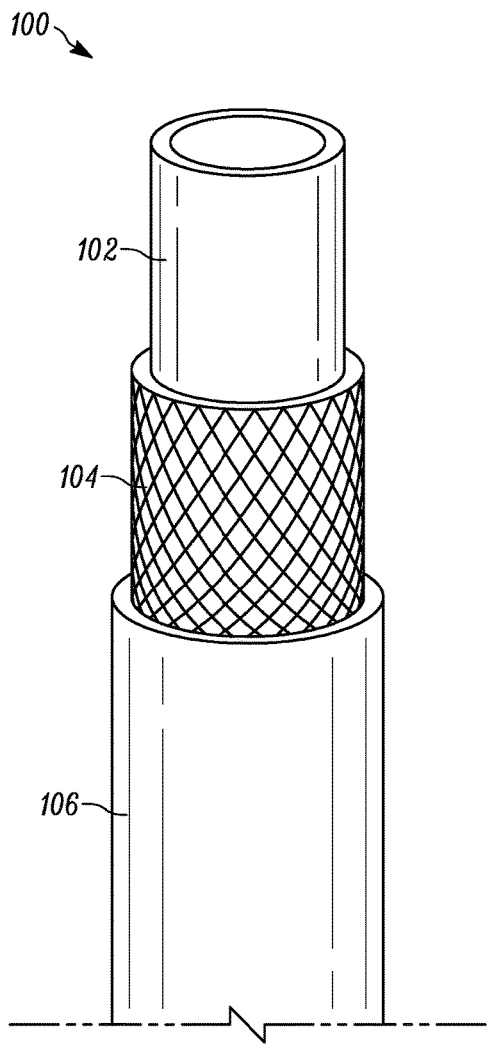
FIG. 1 illustrates in perspective view, a hose according to some aspects of the disclosure; and, FIG. 2 depicts in perspective view, another hose according to some aspects of the disclosure.

Some hose embodiments according to the disclosure have the structure shown in FIG. 1. The hose 100 is composed of at least an inner tube 102, reinforcing layer 104, and outer cover layer 106. In some aspects, the inner tube 102 is formed from the composition according to the disclosure, while in some other aspects, the outer cover layer 106 is formed from the composition according to the disclosure. It is within the scope of the disclosure that both the inner tube 102 and the outer cover layer 106. So long as it is in the range where the properties of the hoses of the disclosure are not impaired, a composition other than the composition of the present disclosure may also, in some aspects, be used for the inner tube 102 or outer cover layer 106.

In some fuel line hose embodiments of the disclosure, by using the composition of the disclosure in this way for the cover layer 106, fuel lines having the desired performance according to specifications, such as the SAE International Standard J30_201202, can be obtained. When using such composition for the cover layer 106, the composition constituting the inner tube is not particularly limited so long as it has characteristics of an extent which does not impair the properties of the fuel line embodiments of the present disclosure.

Referring again to FIG. 1, in some aspects, compositions composed in inner tube 102 and/or cover layer 106 include a blend of chlorinated polyethylene (CPE) and chloroprene rubber (CR). While any suitable weight ratio of CPE:CR may be used, in some cases the CPE and CR are blended in a CPE:CR weight ratio range of from 20:1 to 1:1. The compositions further include a curing system comprising tetrabutylammonium bromide (TBAB), magnesium oxide (MgO), and one of a thiadiazole or thiotriazine material. The compositions further include antimony trioxide as flame retardant synergist in combination with the halogenated materials. Incorporation of other conventional processing materials and materials providing desirable properties is within the spirit and scope of the disclosure.

The curing system for the blend of chlorinated polyethylene (CPE) and chloroprene rubber (CR) is unique in that it avoids the necessity of using peroxide or conventional sulfur curatives, and is thus, devoid of such materials. The curing system also enables use of other desirable materials in place of conventional plasticizers. For example, low cost aromatic oils, which are not typically usable in peroxide based cure systems, may be used in some embodiments of the disclosure.

One useful material in some curing system embodiments of the disclosure is 1,3,5-triazine-2,4,6(1H,3H,5H)-trithione, a thiotriazine compound commercially available, for example, in the Zisnet® family of products.

Another useful material in some other curing system embodiments of the disclosure is N-benzothiazol-2-ylsulfanyl-N-tert-butyl-benzothiazole-2-sulfenamide, a thiadiazole compound commercially available, for example, in the Vanax® family of products.

While any suitable chlorinated polyethylene (CPE) materials may be useful in embodiments of the disclosure, some examples of commercially available CPE materials include the Weipren® family of products from China Yaxing, such as Weipren® 4136LS, Weipren® 7130, and the like. Likewise, any suitable chloroprene rubber (CR) materials may be useful in embodiments of the disclosure, and some examples of commercially available CPE materials include the Baypren® family of products from Arlanxeo Performance Elastomers, such as Baypren® 210, and the like. The range of weight ratios of CPE to CR may be from 20:1 to 1:1, from 9:1 to 7:3, or even from 5:1 to 3:1. In one embodiment the weight ratio of CPE to CR is 4:1.

The reinforcing layer 104 constituting the hose 100 is not particularly limited, but like the reinforcing layer of a conventional hose may be one or more layers of a yarn produced from a vinylon fiber, rayon fiber, polyester fiber, nylon fiber, aramid fiber, etc. or a metal wire or metal alloy wire etc. braided, wrapped in a spiral, or wrapped in a plurality of spiraled layers wound in counter directions.

Further, in the production of some hoses according to the disclosure, it is possible to produce the inner tube 102 by known extrusion processes, provide an optional bonding layer or reinforcement on its outer surface if necessary, braid/spiral the reinforcing layer 104 over the same, and cover the same with the outer cover 106 by extrusion so as to bond the layers of the hose integrally. The hoses may then be cured.

Figure 2:
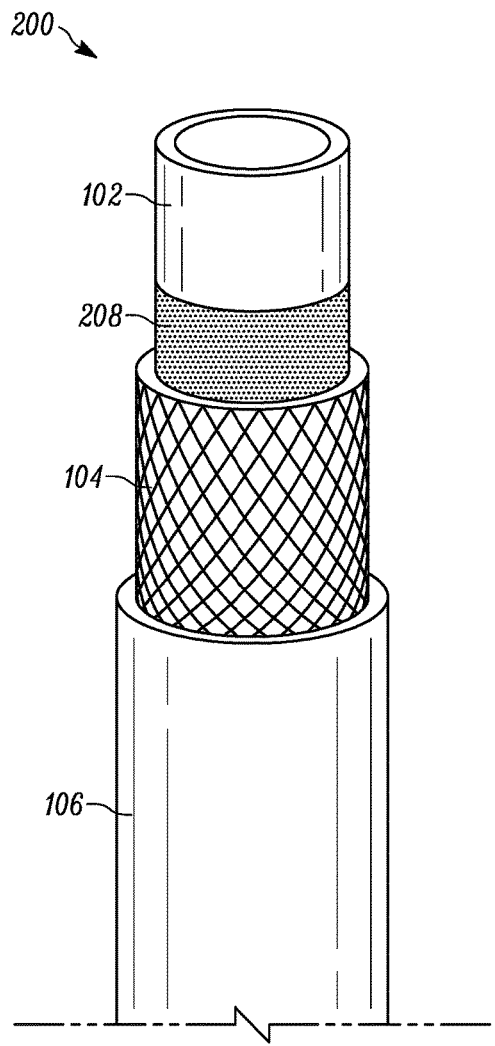

In another aspect of the disclosure, some hose embodiments have the structure shown in FIG. 2. The hose 200 includes an inner tube 102, reinforcing layer 104, outer cover 106, similar to hose 100 described above, and further includes a ply reinforcement layer 208 disposed between inner tube 102 and reinforcing layer 104. The ply reinforcement layer 208 is not particularly limited, but may be produced from a vinylon fiber, rayon fiber, polyester fiber, nylon fiber, or aramid fiber, etc. in a ply configuration.

Figure 3:
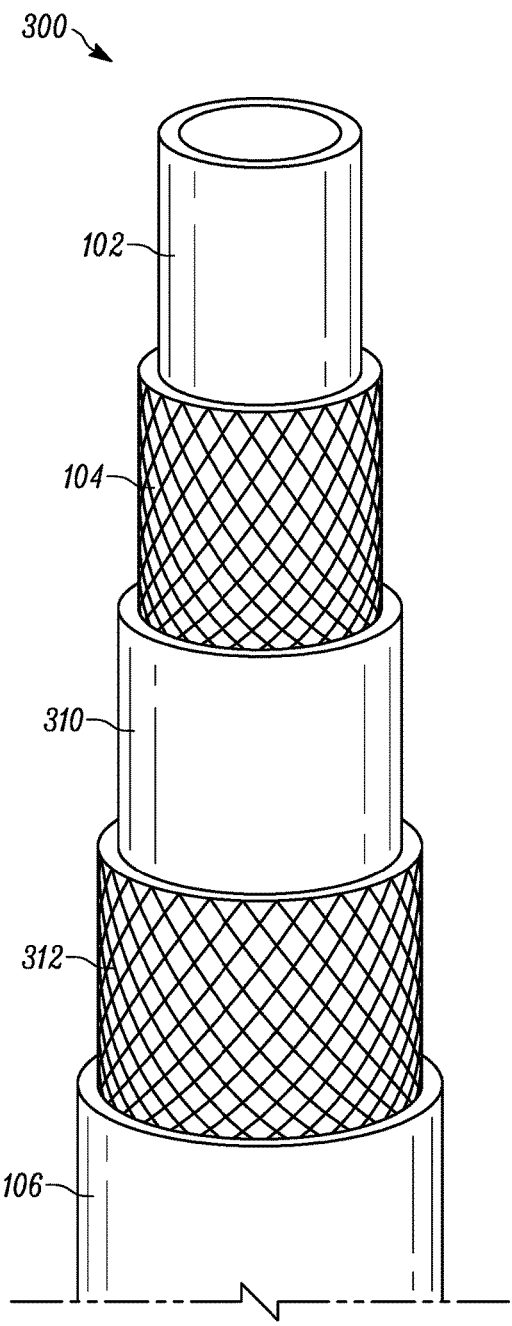
FIG. 3 illustrates in perspective view, yet another hose according to some aspects of the disclosure; and, FIG. 4 depicts in perspective view, another hose according to some aspects of the disclosure.

In yet another aspect of the disclosure, some hose embodiments have the structure shown in FIG. 3. The hose 300 includes an inner tube 102, reinforcing layer 104, friction layer 310, second reinforcing layer 312, and outer cover 106. The second reinforcing layer 312, is not particularly limited, but may be produced from a vinylon fiber, rayon fiber, polyester fiber, nylon fiber, aromatic polyamide fiber, etc. or a hard steel wire etc. braided, wrapped in a spiral, or wrapped in a plurality of spiraled layers wound in counter directions.

Figure 4:
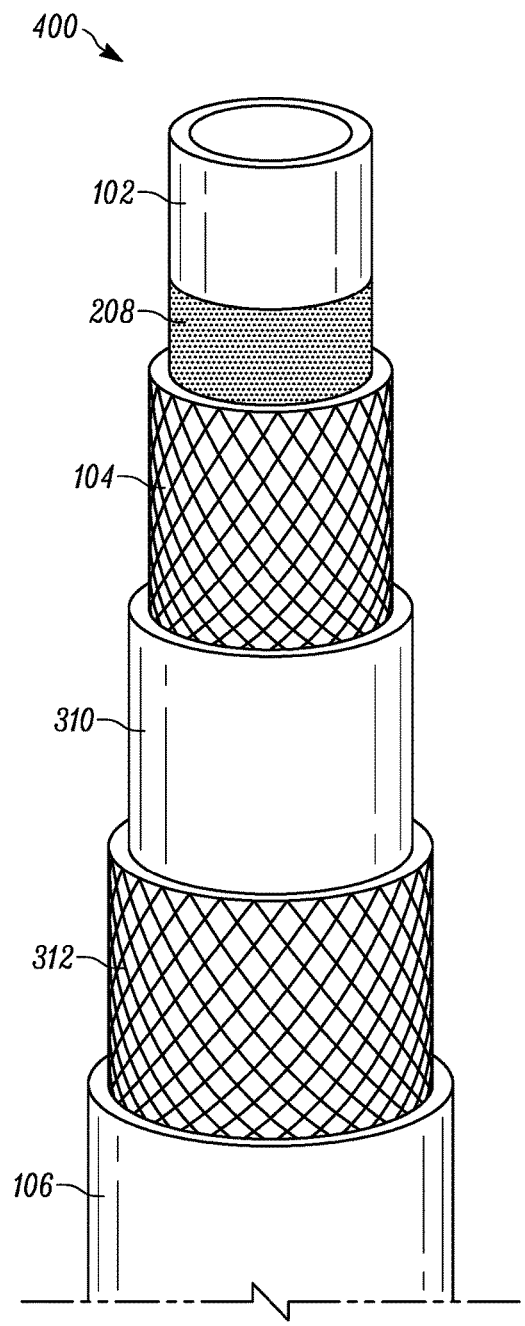

In some another aspects of the disclosure, hose embodiments have the structure shown in FIG. 4. Hose 400 includes an inner tube 102, reinforcing layer 104, friction layer 310, second reinforcing layer 312, and outer cover 106. The hose further includes a ply reinforcement layer 208 disposed between inner tube 102 and reinforcing layer 104.

With regards to the reinforcing layers 104, friction layers 310, second reinforcing layers 312, outer covers 106, and ply reinforcement layers depicted above, such may be formed from any suitable materials know to those of skill in the art. In some aspects, such layers may be formed from those materials disclosed in U.S. Pat. No. 6,179,008 B1, which is incorporated herein by reference thereto.

As described above, each of the reinforcing layers may be formed by spiral winding one or more layers of a yarn or hard steel wire. In those cases where two layers of a yarn, metal wire, or metal alloy wire are used, a first layer may be spiral wound in a first winding direction, and a second layer spiral wound in a second winding direction opposite the first winding direction. In some cases, the first layer is laid at a positive angle relative to the longitudinal axis of the hose, and the second layer laid at a negative angle relative to the longitudinal axis. The angle of one of layers may be between about 45° and 65°, and the angle of the other layers between about −45° and −65°.

The friction layer used in embodiments according to the disclosure is typically from about 0.020 inches (0.5 mm) to about 0.051 inches (1.3 mm) thick, is more typically from about 0.024 inches (0.6 mm) to about 0.0.43 inches (1.1 mm) thick, and in some aspects, will be from about 0.028 inches (0.7 mm) to about 0.035 inches (0.9 mm) in thickness. The friction layer may be formed from any suitable curable rubber based composition, containing such rubber as acrylonitrile butadiene rubber (NBR), hydrogenated NBR, cross-linked NBR (XNBR), fluoroelastomer, epichlorohydrin, nitrile, carboxylated nitrile rubber, CPE, CSM, or blends thereof.

The curable rubber employed in the friction layer of some hoses in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents, talc and fillers, such as carbon black, silica, other mineral fillers, lignin, and the like. Reinforcing fillers are typically utilized at a level which is within the range of about 50 parts per hundred parts of resin (phr) to about 150 phr. In some embodiments, talc is incorporated in an amount of from about 10 phr to about 60 phr, and such may be included in compositions useful in any layers of the hoses.

Referring again to cover layers, in some embodiments according to the disclosure, cover layers have a thickness of from about 0.039 inches (1 mm) to about 0.12 inches (3 mm), from about 0.059 inches (1.5 mm) to about 0.098 inches (2.5 mm), and in some instances, about 0.067 inches (1.7 mm) to about 0.075 inches (1.9 mm). In some aspects, the cover layer can be formed from CPE:CR compositions described above, or other suitable rubbers, such as polychloroprene, NBR/PVC rubber blend, NBR, epichlorohydrin rubber, chlorosulfonated polyethylene, hydrogenated NBR, fluoroelastomer, styrene-butadiene rubber, and the like, or blends thereof. Any of the materials forming the cover layer may be further loaded with metal particles, carbon black, or another electrically-conductive particulate, flake, or fiber filler so as to render the hose electrically-conductive for static dissipation or other applications. The compositions forming the cover layer also include such additives as retardants to prevent an unduly quick cure, antioxidants, adhesion promoters, processing aids, reinforcing agents and fillers, such as carbon black, silica, other mineral fillers, lignin, and the like.

As described above, the inner tube may be formed from CPE:CR compositions described above, or other suitable rubbers, such as polychloroprene, NBR/PVC rubber blend, NBR, epichlorohydrin rubber, chlorosulfonated polyethylene, hydrogenated NBR, fluoroelastomer, styrene-butadiene rubber, and the like, or blends thereof. Any suitable amount of these materials may be used. Additional fillers and additives may be included in the formulation of the composition depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, antistatic agents, coupling agents such as titanates, chain extending oils, tackifiers, flow modifiers, pigments, lubricants, silanes, and other agents, stabilizers, emulsifiers, antioxidants, thickeners, free sulfur, peroxide(s), and/or flame retardants. The formulation of the material may be compounded in a conventional mixing apparatus as an admixture of the rubber and filler components, and any additional fillers or additives.

The thickness of the inner tube in some embodiments according to the disclosure, may be from about 0.089 inches (2 mm) to about 0.157 inches (4 mm), from about 0.098 inches (2.5 mm) to about 0.138 inches (3.5 mm), and in some instances, about 0.106 inches (2.7 mm) to about 0.130 inches (3.3 mm).

EXAMPLES

The following experimental data was generated for the purpose of further illustrating the nature of some of the embodiments and aspects of the disclosure, and are not intended as a limitation on the scope thereof. The following examples were prepared to illustrate improved cover layer and/or inner tube properties for manufacturing and high performance hoses, in accordance with some aspects of the disclosure. The ingredients for each of Ex. 1 to Ex. 5 listed in Table 1, below, were mixed in a Banbury® mixer in a single pass to provide a productive blend, and the example mixtures were dropped at a temperature of 113° C. Then the example mixtures were milled to 2 mm thickness sheets and cured at 163° C. for 30 minutes. This single pass process is distinguished from a typical two pass process where a non-productive blend is first formed, followed a by a second pass with curatives included, to provide a productive blend.

Physical property testing was conducted on the cured example sheets, with values indicated in Tables 2 below. The evaluations for tensile (MPa), elongation %, and Mod 100 (MPa) were conducted according to ASTM D412. Shore A was conducted according to ASTM D2240, and Volume swell % according to ASTM D471. Adhesion to a NBR/PVC compound was conducted by co-curing strips of the example mixtures mated with strips of a NBR/PVC compound, and thereafter, measuring the tear strength on an Instron® instrument.

TABLE 1

| Ingredient | Ex. 1 | Ex. 2 | Ex. 3 | Ex. 4 | Ex. 5 |
| --- | --- | --- | --- | --- | --- |
| Weipren ® 4136LS (CPE) | 45 | 40 | 35 | 30 | 20 |
| Weipren ® 7130 (CPE) | 55 | 50 | 45 | 40 | 30 |
| Baypren ® 210 (CR) | 0 | 10 | 20 | 30 | 50 |
| N762 carbon black | 80 | 80 | 80 | 80 | 80 |
| Calcium Carbonate | 50 | 50 | 50 | 50 | 50 |
| Alumina Trihydrate | 20 | 20 | 20 | 20 | 20 |
| Dioctyl Phthalate (plasticizer) | 35 | 35 | 35 | 35 | 35 |
| 2-ethylhexyl diphenyl phosphate (plasticizer) | 10 | 10 | 10 | 10 | 10 |
| SONGNOX ® 1024 (antioxidant) | 0.5 | 0.5 | 0.5 | 0.5 | 0.5 |
| TMQ (antioxidant) | 0.5 | 0.5 | 0.5 | 0.5 | 0.5 |
| Paraffinic wax | 2 | 2 | 2 | 2 | 2 |
| Zinc Borate | 0.9 | 0.9 | 0.9 | 0.9 | 0.9 |
| Antimony Trioxide | 0.9 | 0.9 | 0.9 | 0.9 | 0.9 |
| Zisnet ® F | 2 | 2 | 2 | 2 | 2 |
| TBAB (50% active) | 1 | 1 | 1 | 1 | 1 |
| Magnesium Oxide | 10 | 10 | 10 | 10 | 10 |
| PHR Running Total: | 312.8 | 312.8 | 312.8 | 312.8 | 312.8 |

TABLE 2

| Test | Ex. 1 | Ex. 2 | Ex. 3 | Ex. 4 | Ex. 5 |
| --- | --- | --- | --- | --- | --- |
| Mooney Scorch (30 mins @ 121° C.) | | | | | |
| ML | 33.5 | 36.23 | 37.4 | 34.41 | 29.33 |
| t5 | 11.0 | 6.03 | 6.0 | 4.94 | 4.64 |
| Mooney Viscosity (@ 100° C.) | | | | | |
| ML(1 + 4) | 82.1 | 81.64 | 86.1 | 78.28 | 65.49 |
| Rheometer (30 mins @ 163° C.) | | | | | |
| Min | 3.63 | 4.151 | 3.8 | 3.885 | 3.227 |
| Max | 15.81 | 14.86 | 17.91 | 14.81 | 15.84 |
| Tris1 | 1.51 | 0.96 | 0.94 | 0.68 | 0.59 |
| T25 | 4.1 | 2.28 | 2.2 | 1.21 | 1.05 |
| S25 | 6.68 | 6.822 | 7.31 | 6.609 | 6.377 |
| T90 | 24.13 | 25.32 | 23.55 | 25.87 | 3.42 |
| S90 | 14.61 | 13.79 | 16.5 | 13.71 | 14.57 |
| Rate | 1.07 | 1.79 | 2.22 | 3.39 | 5.19 |
| Amount | 12.18 | 10.71 | 14.11 | 10.92 | 12.61 |
| Original Physical Properties | | | | | |
| Tensile, MPa | 9.6 | 9.9 | 10.2 | 10.1 | 10.2 |
| Elongation, % | 423 | 366 | 342 | 298 | 260 |
| Mod 100, MPa | 3.3 | 3.3 | 3.4 | 3.4 | 3.6 |
| Shore A Hardness, pts | 77 | 73 | 74 | 72 | 71 |
| Air Oven Age (70 mins @ 100° C.) | | | | | |
| Tensile retention, % | 108 | 107 | 101 | 102 | 89 |
| Elongation retention, % | 74 | 76 | 76 | 85 | 76 |

TABLE 2-continued

| Test | Ex. 1 | Ex. 2 | Ex. 3 | Ex. 4 | Ex. 5 |
| --- | --- | --- | --- | --- | --- |
| Hardness change, pts | +1 | +4 | +3 | +5 | +4 |
| Fluid Immersion (70 mins @ 100° C./IRM903) | | | | | |
| Volume Swell % | 61 | 58 | 50 | 53 | 45 |
| Adhesion to a NBR/PVC compound, N/mm | 5.8 | 20.0 | 14.3 | 19.6 | 19.6 |

The above test results show the advantages of using a blend of CPE and CR to achieve at least acceptable, if not superior properties for forming such articles as cover layers, inner tubes, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A composition comprising:
   a) a blend of chlorinated polyethylene (CPE) and chloroprene rubber (CR), wherein the CPE and CR are blended in a CPE:CR weight ratio of from 20:1 to 1:1; and,
   b) a curing system comprising tetrabutylammonium bromide (TBAB), magnesium oxide (MgO), and thiotriazine.

2. The composition according to claim 1, wherein the TBAB is incorporated in an amount of from 0.2 phr to 2.5 phr, wherein the MgO is incorporated in an amount of from 5 phr to 20 phr, and wherein the thiotriazine is incorporated in an amount of from 0.5 phr to 5 phr, and wherein the composition is devoid of a conventional plasticizer.

3. The composition according to claim 1, wherein the curing system devoid of free sulfur and peroxide.

4. The composition according to claim 1, the composition further comprising antimony trioxide.

5. The composition according to claim 1, wherein the TBAB is incorporated in an amount of from 0.3 phr to 2 phr.

6. The composition according to claim 1, wherein the thiotriazine is incorporated in an amount of from 0.8 phr to 3 phr.

7. The composition according to claim 1, wherein the CPE:CR weight ratio is of from 9:1 to 7:3.

8. The composition according to claim 1 as incorporated into a cover layer of a rubber article.

9. The composition according to claim 1 as incorporated into an inner tube layer of a rubber article.

10. The composition according to claim 1 as incorporated into one or more layers of a fuel line, a welding hose, a cold side return turbo charger hose, a conveyor belt, a power transmission belt, or an air spring.

11. A fuel line comprising an inner tube, a reinforcement layer disposed outwardly from the inner tube, and a cover layer disposed outwardly from the reinforcement layer;
wherein the cover layer comprises:
 a) a blend of chlorinated polyethylene (CPE) and chloroprene rubber (CR), wherein the CPE and CR are blended in a CPE:CR weight ratio of from 20:1 to 1:1; and,
 b) a curing system comprising tetrabutylammonium bromide (TBAB), magnesium oxide (MgO), and thiotriazine; and,
wherein the cover layer meets the specifications of SAE International Standard J30 201202.

12. The fuel line according to claim 11, wherein the TBAB is incorporated in an amount of from 0.2 phr to 2.5 phr, wherein the MgO is incorporated in an amount of from 5 phr to 20 phr, and wherein the thiotriazine is incorporated in an amount of from 0.5 phr to 5 phr, and wherein the composition is devoid of a conventional plasticizer.

13. The fuel line according to claim 11, wherein the curing system devoid of free sulfur and peroxide.

14. The fuel line according to claim 11, the cover layer further comprising antimony trioxide.

15. The fuel line according to claim 11, wherein the TBAB is incorporated in an amount of from 0.3 phr to 2 phr.

16. The fuel line according to claim 11, wherein the thiotriazine is incorporated in an amount of from 0.8 phr to 3 phr.

17. The fuel line according to claim 11, wherein the CPE:CR weight ratio is of from 9:1 to 7:3.

18. The fuel line according to claim 11, wherein the inner tube comprises a blend of chlorinated polyethylene (CPE) and chloroprene rubber (CR), wherein the CPE and CR are blended in a CPE:CR weight ratio of from 20:1 to 1:1.

19. The fuel line according to claim 11, wherein the inner tube comprises nitrile butadiene rubber (NBR).

20. A hose comprising an inner tube, a reinforcement layer disposed outwardly from the inner tube, and a cover layer disposed outwardly from the reinforcement layer;
wherein the inner tube comprises:
 a) a blend of chlorinated polyethylene (CPE) and chloroprene rubber (CR), wherein the CPE and CR are blended in a CPE:CR weight ratio of from 20:1 to 1:1; and,
 b) a curing system comprising tetrabutylammonium bromide (TBAB), magnesium oxide (MgO), and thiotriazine.

* * * * *